Jan. 3, 1939.    G. W. DIXON    2,142,887
FISHING HARNESS
Filed June 3, 1937
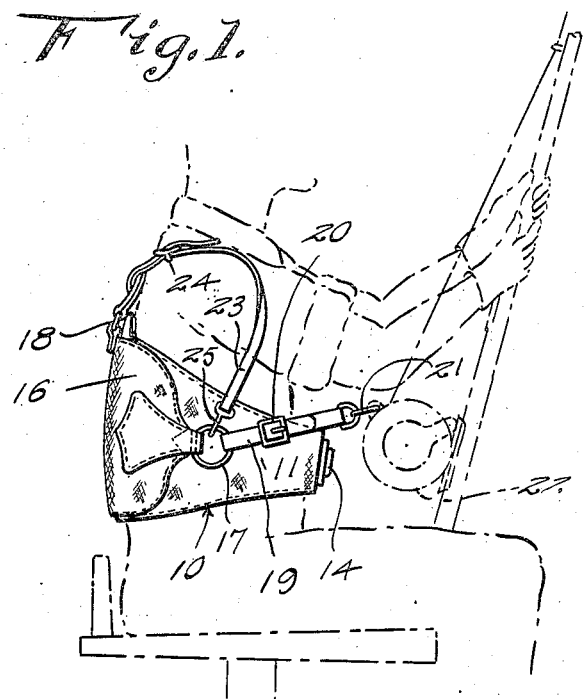
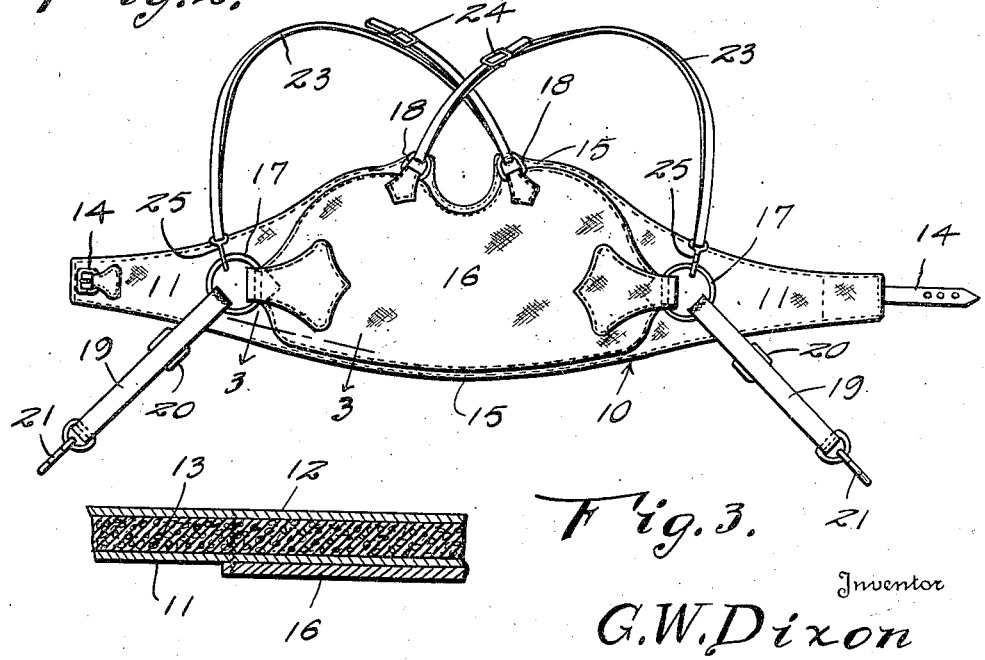
Inventor
G. W. Dixon
By L. F. Randolph
Attorney Patented Jan. 3, 1939

2,142,887

UNITED STATES PATENT OFFICE 2,142,887

FISHING HARNESS

Gilbert W. Dixon, Rydal, Pa.

Application June 3, 1937, Serial No. 146,261

1 Claim. (Cl. 224—5)

This invention relates to an improved fishing harness of a belt type adapted to be worn around the waist.

The object of the invention is to provide supporting means for a fishing rig of a type used in big game fishing, to be worn in such a manner that the pressure will be against the back of the wearer.

Another object of the invention is to provide a belt to carry a supporting strip to which the fishing rig is secured.

A further object of the invention is to provide cushioning means contained within the belt, and supporting means adapted to extend over the shoulders of the wearer to support the belt in position.

Other objects and advantages of the invention will become apparent from the specification of which the drawing forms a part, and wherein:—

Figure 1 is a side elevational view of the device in use,

Figure 2 is a top plan view of the invention, and

Figure 3 is a sectional view on the line 3—3 of Figure 2.

Referring more particularly to the drawing wherein like reference characters designate like or corresponding parts in the different views, 10 is a belt having an outer portion 11 preferably formed of leather, and an inner portion 12 of canvas or the like and cushioning means 13 secured between the portions 11 and 12 of sponge rubber or the like. The opposite ends of belt 10 are provided with any suitable fastening means 14 to secure the belt around the waist of the wearer. The intermediate portion of belt 10 is enlarged at 15 to provide a greater supporting surface against the back of the wearer.

Secured to the portion 15 is a reinforcing or supporting piece 16, preferably formed of saddle leather or the like. Strip 16 is provided with rings 17 secured to the opposite ends thereof, and rings 18 secured at the top in spaced relationship. Straps 19, adjustable by means of buckles 20 are connected to rings 17, and are provided at their opposite end with snap hooks 21 adapted to be connected to a reel of a fishing rig shown in dotted lines at 22.

Straps 23 provided with adjusting means such as buckles 24 and with snap hooks 25 to engage the rings 17, are secured between the rings 18 and the rings 17, being crossed as seen in Figure 2. Straps 23 are adapted to engage the shoulders of the wearer to support the belt in position, and may be entirely dispensed with if desired.

In use, belt 10 is attached about the waist of the wearer with the wide part 15 to the back and with the reinforcing strip 16 on the outside. Snap hooks 21 secured to straps 19, are then connected to the reel of the fishing rig 22. Belt 10 is ordinarily worn low on the waist of the wearer, so that the pull from the rig 22 on the supporting piece 16 will be against the lower part of the back. If straps 23 are used they will not be affected by the pull from rig 22. This greatly increases the efficiency of the belt since the user is much more able to resist the pull against the lower part of his back than if the pull were from around the shoulders. The cushioning means 13 and the width of the belt at 15 prevent the supporting piece 16 from cutting into the back of the wearer.

It is to be understood that only the preferred embodiment of the invention has been shown and described, the right being reserved to make such changes and modifications in the structure of the invention as disclosed as will not depart from the spirit and scope of the claim.

I claim as my invention:

A fishing harness comprising a belt provided with an enlarged portion intermediate of its ends, a supporting piece or saddle secured to said enlarged portion on the outer side of the belt, said supporting piece being of substantially the same width as the belt, rings connected to the opposite ends of the supporting piece, and connecting means attached to said rings and to a fishing rig, said rings and connecting means being held away from contact with the body of the wearer by the adjacent end portions of the belt.

GILBERT W. DIXON.